United States Patent
Chakra et al.

(10) Patent No.: US 10,326,855 B2
(45) Date of Patent: Jun. 18, 2019

(54) TRENDING TOPIC DRIVEN CACHE EVICTION MANAGEMENT

(71) Applicant: International Business Machines Corporation, Armonk, NY (US)

(72) Inventors: Al Chakra, Apex, NC (US); Patrick S. O'Donnell, Apex, NC (US); Kevin L. Ortega, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 15/222,319

(22) Filed: Jul. 28, 2016

(65) Prior Publication Data
US 2018/0034931 A1 Feb. 1, 2018

(51) Int. Cl.
*H04L 29/06* (2006.01)
*H04L 29/08* (2006.01)
*G06F 12/0813* (2016.01)

(52) U.S. Cl.
CPC ...... *H04L 67/2842* (2013.01); *G06F 12/0813* (2013.01); *H04L 67/02* (2013.01);
(Continued)

(58) Field of Classification Search
CPC . H04L 67/2842; H04L 67/02; H04L 67/1097; H04L 67/2852; H04L 67/42;
(Continued)

(56) References Cited

U.S. PATENT DOCUMENTS

2002/0087797 A1* 7/2002 Adrangi ............ G06F 12/0888
711/133
2008/0320222 A1 12/2008 Dhodapkar et al.
(Continued)

FOREIGN PATENT DOCUMENTS

WO WO0167250 A3 9/2001

OTHER PUBLICATIONS

Loach, Scot, "CPE-Caching Using Network Inefficiency to Deliver Better Internet Streaming," Aterlo Networks, Spring Technical ForumProceedings, 2015.

*Primary Examiner* — Nicholas R Taylor
*Assistant Examiner* — Chong G Kim
(74) *Attorney, Agent, or Firm* — Steven M. Greenberg, Esq.; Shutts & Bowen LLP

(57) ABSTRACT

A content serving data processing system is configured for trending topic cache eviction management. The system includes a computing system communicatively coupled to different sources of content objects over a computer communications network. The system also includes a cache storing different cached content objects retrieved from the different content sources. The system yet further includes a cache eviction module. The module includes program code enabled to manage cache eviction of the content objects in the cache by marking selected ones of the content objects as invalid in accordance with a specified cache eviction strategy, detect a trending topic amongst the retrieved content objects, and override the marking of one of the selected ones of the content objects as invalid and keeping the one of the selected ones of the content objects in the cache when the one of the selected ones of the content objects relates to the trending topic.

20 Claims, 1 Drawing Sheet

(52) U.S. Cl.
CPC ...... *H04L 67/1097* (2013.01); *H04L 67/2852*
(2013.01); *H04L 67/42* (2013.01); *G06F*
*2212/154* (2013.01)

(58) Field of Classification Search
CPC ............. G06F 12/0813; G06F 12/0891; G06F
2212/154; G06F 2212/60; G06F 2212/62
USPC ........................................................ 709/203
See application file for complete search history.

(56) References Cited

U.S. PATENT DOCUMENTS

| | | |
|---|---|---|
| 2009/0307332 A1 | 12/2009 | Litwin |
| 2010/0235569 A1 | 9/2010 | Nishimoto et al. |
| 2010/0332513 A1* | 12/2010 | Azar ................ G06F 17/30469 707/769 |
| 2011/0040861 A1 | 2/2011 | Van Der Merwe et al. |
| 2011/0320715 A1 | 12/2011 | Ickman et al. |
| 2013/0080611 A1* | 3/2013 | Li ........................ H04N 21/222 709/223 |
| 2013/0204961 A1* | 8/2013 | Fliam .................. H04L 67/2885 709/214 |
| 2014/0129779 A1* | 5/2014 | Frachtenberg ........ G06F 12/122 711/136 |
| 2014/0280206 A1* | 9/2014 | Krishnamurthy ... G06F 17/3089 707/748 |
| 2015/0234912 A1 | 8/2015 | Gorman et al. |
| 2016/0019167 A1 | 1/2016 | Krishnamurthy et al. |

\* cited by examiner

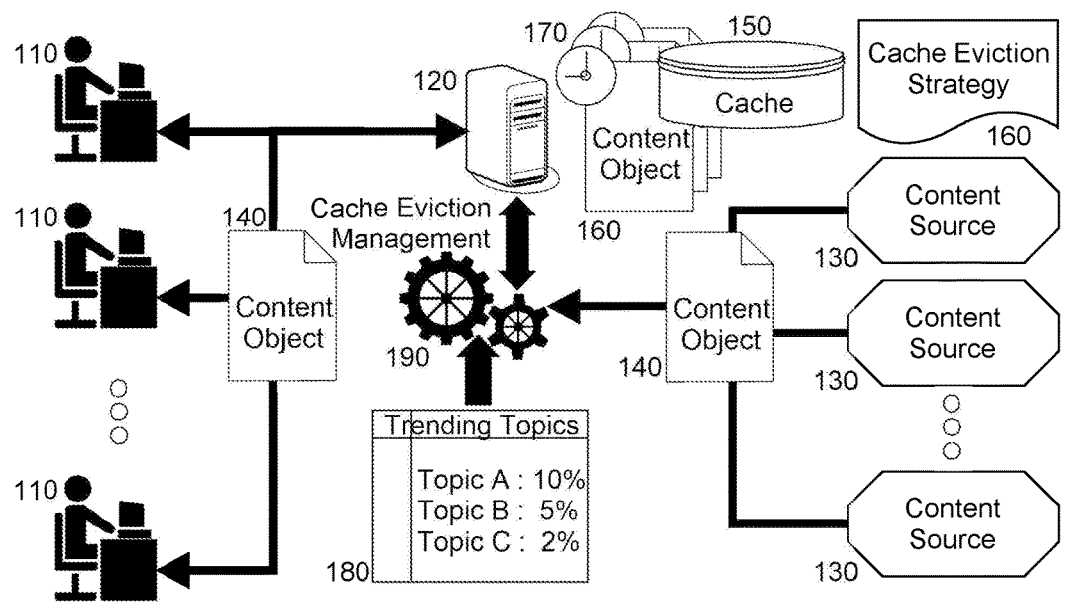
FIG. 1
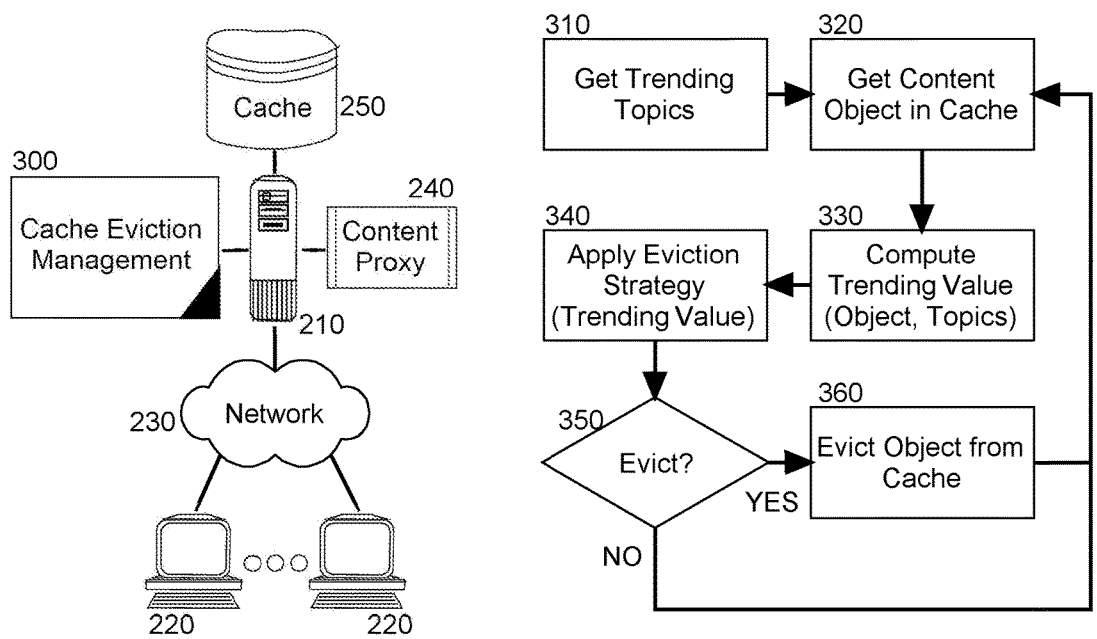
FIG. 2
FIG. 3

TRENDING TOPIC DRIVEN CACHE EVICTION MANAGEMENT

BACKGROUND OF THE INVENTION

Field of the Invention

The present invention relates to cache management and more particularly to cache eviction.

Description of the Related Art

In computing and software development, cache eviction is the process in which the cache will discard or evict unused data and information to make room for new data and information. The cache is an element of a computer system which stores data so that future calls for particular data can be made quickly. Cache elements can be a hardware or software component and tend to be small, so it is important that the data that is chosen to remain stored on the cache is chosen carefully and efficiently. Cache evictions allow data that is not frequently used, data that hasn't been used for a certain amount of time, or other parameters of data to be replaced so that the cache has more hits, that is data in the cache is being used more efficiently.

There are two main forms of cache eviction. The contents of the cache can either be evicted to a hard disk for permanent storage or discarded completely. The DiskStore function is used unbounded by size as a default, however, a maximum volume can be set. The default algorithm for a DiskStore eviction is Least Frequency Used (LFU). Alternatively, when contents of the cache are discarded completely other algorithms such as Least Recently Used (LRU), First In First Out (FIFO), Random Replacement (RR), or Adaptive Replacement Cache (ARC) which is a hybrid of LRU and LFU may be used. These algorithms work by marking the data by how often it's used, how long it has been stored in the cache, or whatever parameter the user wants to use and then discarding the data that exceeds the benchmark set. Each programmer can choose what parameters would work best for whatever program they are using, but algorithms that are going to save the user money, time, and not waste cache size on larger data files or constantly changing files tend to be more popular.

When an algorithm is deciding which data to discard important properties of the cache need to determined. The 'hit ratio' and the latency are two properties that can value a cache. The hit ratio is a ratio that describes how often data searched for is found in the cache and latency is used to describe how long it takes for that data to be retrieved. Latency and hit ratios are used to determine which algorithm criteria for eviction is best suited for each program. The algorithms above also use different techniques to evict data from the cache. Time based eviction is simply when the oldest data remaining in the cache is removes whereas size based eviction is when the largest remaining piece of data is removed. Certain algorithms such as LFU, LRU and ARC assign weights to the data in the cache so that lower weighted data is what is evicted. Finally, explicit removal is when very specific data is what is evicted from the cache.

BRIEF SUMMARY OF THE INVENTION

Embodiments of the present invention address deficiencies of the art in respect to cache eviction and provide a novel and non-obvious method, system and computer program product for trending topic cache eviction management. In an embodiment of the invention, a method for trending topic cache eviction management includes receiving in memory of a server different requests for content objects from different client computers communicatively coupled to the server over a computer communications network. The method additionally includes retrieving in the memory of the server from different sources of content objects from over the computer communications network, content objects requested in the different requests and forwarding the retrieved content objects to corresponding requesting ones of the different client computers.

Yet further, the method includes caching the retrieved content objects in a cache coupled to the server. Finally, the method includes managing cache eviction of the content objects in the cache by marking selected ones of the content objects as invalid in accordance with a specified cache eviction strategy, detecting a trending topic amongst the retrieved content objects, and overriding the marking of one of the selected ones of the content objects as invalid and keeping the one of the selected ones of the content objects in the cache when the one of the selected ones of the content objects relates to the trending topic.

In one aspect of the embodiment, the trending topic is detected by parsing text in the retrieved content objects, computing a frequency of one or more words of the parsed text appearing in the retrieved content objects and determining that the computed frequency exceeds a threshold value so as to indicate a trending topic. In another aspect of the embodiment, the one of the selected ones of the content objects is determined to relate to the trending topic when one or more words of the trending topic appear in the one of the selected ones of the content objects. In yet another aspect of the embodiment, the one of the selected ones of the content objects is determined to relate to the trending topic when a classification of one or more words of the trending topic matches a classification of the one of the selected ones of the content objects. Finally, in even yet another aspect of the embodiment, the one of the selected ones of the content objects is determined to relate to the trending topic when a classification of one or more words of the trending topic matches a classification of an image in the one of the selected ones of the content objects.

Of note, each of the content objects are cached along with a trending value indicative of a relatedness with one or more contemporaneously determined trending topics. As such, the one of the selected ones of the content objects is determined to relate to the trending topic when a corresponding trending value exceeds a threshold value. Alternatively, the trending value weights a result of the cache eviction strategy so as to determine whether or not to mark a corresponding one of the content objects in the cache as invalid.

In another embodiment of the invention, a content serving data processing system is configured for trending topic cache eviction management. The system includes a computing system with at least one computer with memory and at least one processor and communicatively coupled to different sources of content objects over a computer communications network. The system also includes a cache storing different cached content objects retrieved from the different content sources. The system yet further includes a cache eviction module. The module includes program code enabled upon execution in the memory of the computing system to perform the steps of managing cache eviction of the content objects in the cache by marking selected ones of the content objects as invalid in accordance with a specified cache eviction strategy, detecting a trending topic amongst the retrieved content objects, and overriding the marking of one of the selected ones of the content objects as invalid and keeping the one of the selected ones of the content objects in the cache when the one of the selected ones of the content objects relates to the trending topic.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein:

FIG. 1 is a pictorial illustration of a process for trending topic cache eviction management;

FIG. 2 is a schematic illustration of a content serving data processing system configured for trending topic cache eviction management; and, FIG. 3 is a flow chart illustrating a process for trending topic cache eviction management.

DETAILED DESCRIPTION OF THE INVENTION

Embodiments of the invention provide for trending topic cache eviction management. In accordance with an embodiment of the invention, content is placed in a cache as content is requested for retrieval from different sources of content over a computer communications network. Periodically, content within the cache is evicted in accordance with a cache eviction strategy, such as LRU, LFR, FIFO, RR or ARC or any combination thereof. However, different content trends also are periodically detected, for example by detecting patterns of text in the content requested from the different sources of content. As such, though content in the cache may be invalidated for eviction in accordance with one or more cache eviction strategies, the determination to evict content that is consistent with a detected content trend is overridden and the content for which eviction is overridden is permitted to remain in the cache.

In further illustration, FIG. 1 is a pictorial illustration of a process for trending topic cache eviction management. As shown in FIG. 1, different end users 110 request from a content proxy 120 different content objects 140, such as Web pages, from different content sources 130 such as different Web sites. The content proxy 120 may be a client computing device or a server and may include a cache 150 in which content objects 140 retrieved for the end users 110 are cached. Cache eviction management logic 190 determines according to a cache eviction strategy 160 which cached content objects 160 are to be evicted from the cache based upon the cache eviction strategy and in accordance with the cache eviction strategy 160, marks selected ones of the content objects 160 in the cache 150 as invalid and ripe for eviction.

Importantly, cache eviction management logic 190 maintains a table of trending topics 180. The table of trending topics 180 includes different topics appearing with a threshold frequency in the content objects 160 in the cache 150. Utilizing the table of trending topics 180, the cache eviction management logic 190 overrides the marking of different ones of the content objects 160 in the cache 150 when the different ones of the content objects 160 indicate a relatedness with one or more trending topics in the table of trending topics 180. In this regard, the cache eviction management logic 190 may determine the relatedness when one or more words of a trending topic appear in a content object 160 in the cache 150, or when a classification of one or more words of a trending topic matches a classification of a content object 160 in the cache 150, or when a classification of one or more words of a trending topic matches a classification of an image in a content object 160 in the cache 150.

Optionally, each of the content objects 160 in the cache 150 is stored in the cache 150 in connection with a trending value 170. The trending value 170 indicates a degree of relatedness between a corresponding one of the content objects 160 and one or more trending topics in the table of trending topics 180. The content eviction management logic 190 periodically updates the trending values 170 for each of the content objects 160 in the cache 150 as the table of trending topics 180 is updated based upon the composition of content objects 160 in the cache 150. Consequently, the cache eviction management logic 190 may override an otherwise determination to invalidate one or more of the content objects 160 in the cache 150 when corresponding ones of the trending values 170 exceeds a threshold value. Alternatively, the cache eviction management logic 190 may combine each trending value 170 with an eviction value such as a timestamp of a corresponding one of the content objects 160 so as to weight the eviction value against eviction prior to the cache eviction management logic 190 determining whether or not to mark the corresponding one of the content objects 160 as invalid.

The process described in connection with FIG. 1 may be implemented in a content serving data processing system. In yet further illustration, FIG. 2 schematically shows a content serving data processing system configured for trending topic cache eviction management. The system includes a computing system 210 with at least one computer with memory and at least one processor and communicatively coupled to different sources of content objects (not shown) over a computer communications network 230. The system also includes a cache 250 storing different cached content objects retrieved on behalf of different client computing devices 220 from the different content sources (not shown) by a content proxy 240.

The system yet further includes a cache eviction module 300. The module 300 includes program code enabled upon execution in the memory of the computing system 210 to perform the steps of managing cache eviction of the content objects in the cache 250 by marking selected ones of the content objects as invalid in accordance with a specified cache eviction strategy, detecting a trending topic amongst the retrieved content objects, and overriding the marking of one of the selected ones of the content objects as invalid and keeping the one of the selected ones of the content objects in the cache 250 when the one of the selected ones of the content objects relates to the trending topic.

In yet further illustration of the operation of the cache eviction management module 300, FIG. 3 is a flow chart illustrating a process for trending topic cache eviction management. Beginning in block 310, the program code of the module computes different trending topics in a table of trending topics based upon the content of content objects in the cache, for instance by determining a threshold frequency of appearance of one or more words in the text of the content objects in the cache. In block 320, the program code of the module retrieves a first content object in the cache and in block 330, a trending value for the content object is computed based upon a relatedness between the content object and one or more trending topics in the table of trending topics.

In block 340, the program code of the module applies an eviction strategy to the content object so as to determine whether or not to mark the content object as invalid and thus ripe for eviction from the cache. However, the program code of the module includes in connection with the eviction strategy consideration of the trending value of the content object so as to potentially override a determination of eviction for the content object should the trending value exceed a threshold value. Thereafter, in decision block 350, the program code of the module determines whether or not to evict the content object. If so, in block 360 the program code of the module evicts the content object from the cache. Thereafter, a next content object in the cache is selected for processing and the process begins anew.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A method for trending topic cache eviction management, the method comprising:
receiving in memory of a server different requests for content objects from different client computers communicatively coupled to the server over a computer communications network;
retrieving in the memory of the server from different sources of content objects from over the computer communications network, content objects requested in the different requests and forwarding the retrieved content objects to corresponding requesting ones of the different client computers;
caching the retrieved content objects in a cache coupled to the server along with a trending value indicating a degree of relatedness between a corresponding one of the content objects and one or more trending topics in a table of trending topics maintained by eviction logic managing cache eviction of selected ones of the content objects in the cache; and,
managing cache eviction of the content objects in the cache by the eviction logic by first marking selected ones of the content objects as invalid in accordance with a specified cache eviction strategy so as to evict the marked selected ones of the content objects from the cache, and subsequently detecting a trending topic amongst the retrieved content objects, overriding the marking of one of the selected ones of the content objects as invalid and keeping the one of the selected ones of the content objects in the cache when the one of the selected ones of the content objects relates to the trending topic while evicting from the cache remaining ones of the content objects marked for eviction from the cache.

2. The method of claim 1, wherein the trending topic is detected by parsing text in the retrieved content objects, computing a frequency of one or more words of the parsed text appearing in the retrieved content objects and determining that the computed frequency exceeds a threshold value so as to indicate a trending topic.

3. The method of claim 1, wherein the one of the selected ones of the content objects is determined to relate to the trending topic when one or more words of the trending topic appear in the one of the selected ones of the content objects.

4. The method of claim 1, wherein the one of the selected ones of the content objects is determined to relate to the trending topic when a classification of one or more words of the trending topic matches a classification of the one of the selected ones of the content objects.

5. The method of claim 1, wherein the one of the selected ones of the content objects is determined to relate to the trending topic when a classification of one or more words of the trending topic matches a classification of an image in the one of the selected ones of the content objects.

6. The method of claim 1, wherein each of the content objects are cached along with a trending value indicative of a relatedness with one or more contemporaneously determined trending topics and wherein the one of the selected ones of the content objects is determined to relate to the trending topic when a corresponding trending value exceeds a threshold value.

7. The method of claim 1, wherein each of the content objects are cached along with a trending value indicative of a relatedness with one or more contemporaneously determined trending topics and wherein the trending value weights a result of the cache eviction strategy so as to determine whether or not to mark a corresponding one of the content objects in the cache as invalid.

8. A content serving data processing system configured for trending topic cache eviction management, the system comprising:
a computing system comprising at least one computer with memory and at least one processor and communicatively coupled to different sources of content objects over a computer communications network;
a cache storing different cached content objects retrieved from the different content sources along with a trending value indicating a degree of relatedness between a corresponding one of the content objects and one or more trending topics in a table of trending topics maintained by eviction logic managing cache eviction of selected ones of the content objects in the cache; and,
a cache eviction module comprising program code enabled upon execution in the memory of the computing system to perform the steps of:
managing cache eviction of the content objects in the cache by the eviction logic by first marking selected ones of the content objects as invalid in accordance with a specified cache eviction strategy so as to evict the marked selected ones of the content objects from the cache, and subsequently detecting a trending topic amongst the retrieved content objects, overriding the marking of one of the selected ones of the content objects as invalid and keeping the one of the selected ones of the content objects in the cache when the one of the selected ones of the content objects relates to the trending topic while evicting from the cache remaining ones of the content objects marked for eviction from the cache.

9. The system of claim 8, wherein the trending topic is detected by parsing text in the retrieved content objects, computing a frequency of one or more words of the parsed text appearing in the retrieved content objects and determining that the computed frequency exceeds a threshold value so as to indicate a trending topic.

10. The system of claim 8, wherein the one of the selected ones of the content objects is determined to relate to the trending topic when one or more words of the trending topic appear in the one of the selected ones of the content objects.

11. The system of claim 8, wherein the one of the selected ones of the content objects is determined to relate to the trending topic when a classification of one or more words of the trending topic matches a classification of at least a portion of the one of the selected ones of the content objects.

12. The system of claim 8, wherein each of the content objects are cached along with a trending value indicative of a relatedness with one or more contemporaneously determined trending topics and wherein the one of the selected ones of the content objects is determined to relate to the trending topic when a corresponding trending value exceeds a threshold value.

13. The system of claim 8, wherein each of the content objects are cached along with a trending value indicative of a relatedness with one or more contemporaneously determined trending topics and wherein the trending value weights a result of the cache eviction strategy so as to determine whether or not to mark a corresponding one of the content objects in the cache as invalid.

14. A computer program product for trending topic cache eviction management, the computer program product comprising a computer readable storage medium having program instructions embodied therewith, the program instructions executable by a device to cause the device to perform a method comprising:

receiving in memory of a server different requests for content objects from different client computers communicatively coupled to the server over a computer communications network;

retrieving in the memory of the server from different sources of content objects from over the computer communications network, content objects requested in the different requests and forwarding the retrieved content objects to corresponding requesting ones of the different client computers;

caching the retrieved content objects in a cache coupled to the server along with a trending value indicating a degree of relatedness between a corresponding one of the content objects and one or more trending topics in a table of trending topics maintained by eviction logic managing cache eviction of selected ones of the content objects in the cache; and, managing cache eviction of the content objects in the cache by the eviction logic by first marking selected ones of the content objects as invalid in accordance with a specified cache eviction strategy so as to evict the marked selected ones of the content objects from the cache, and subsequently detecting a trending topic amongst the retrieved content objects, overriding the marking of one of the selected ones of the content objects as invalid and keeping the one of the selected ones of the content objects in the cache when the one of the selected ones of the content objects relates to the trending topic while evicting from the cache remaining ones of the content objects marked for eviction from the cache.

15. The computer program product of claim 14, wherein the trending topic is detected by parsing text in the retrieved content objects, computing a frequency of one or more words of the parsed text appearing in the retrieved content objects and determining that the computed frequency exceeds a threshold value so as to indicate a trending topic.

16. The computer program product of claim 14, wherein the one of the selected ones of the content objects is determined to relate to the trending topic when one or more words of the trending topic appear in the one of the selected ones of the content objects.

17. The computer program product of claim 14, wherein the one of the selected ones of the content objects is determined to relate to the trending topic when a classification of one or more words of the trending topic matches a classification of the one of the selected ones of the content objects.

18. The computer program product of claim 14, wherein the one of the selected ones of the content objects is determined to relate to the trending topic when a classification of one or more words of the trending topic matches a classification of an image in the one of the selected ones of the content objects.

19. The computer program product of claim 14, wherein each of the content objects are cached along with a trending value indicative of a relatedness with one or more contemporaneously determined trending topics and wherein the one of the selected ones of the content objects is determined to relate to the trending topic when a corresponding trending value exceeds a threshold value.

20. The computer program product of claim 14, wherein each of the content objects are cached along with a trending value indicative of a relatedness with one or more contemporaneously determined trending topics and wherein the trending value weights a result of the cache eviction strategy so as to determine whether or not to mark a corresponding one of the content objects in the cache as invalid.

* * * * *